A. R. DODGE.
FLUID METER.
APPLICATION FILED SEPT. 25, 1909.
1,087,932.
Patented Feb. 24, 1914.
4 SHEETS—SHEET 4.
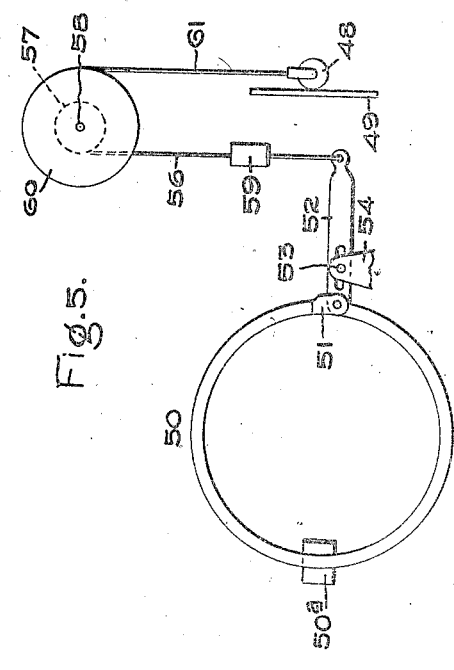
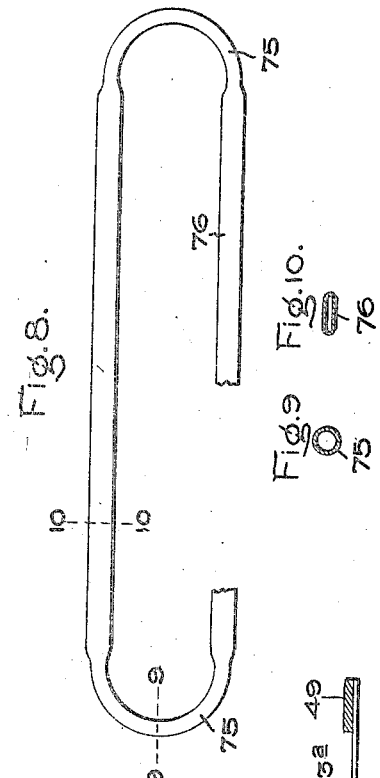
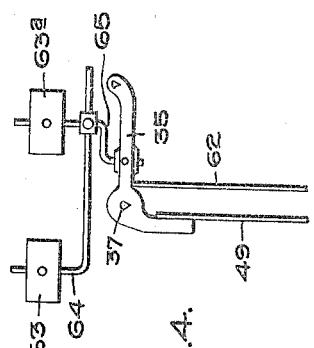
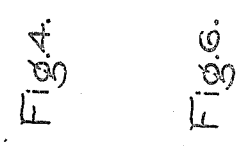
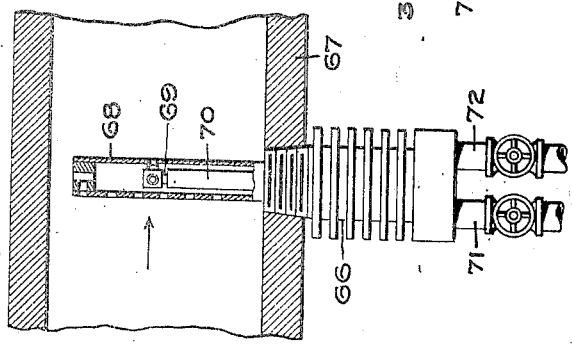
Witnesses:
Marcus L. Byng
J. Ellis Glen
Inventor:
Austin R. Dodge,
by Albert G. Davis
His Attorney.

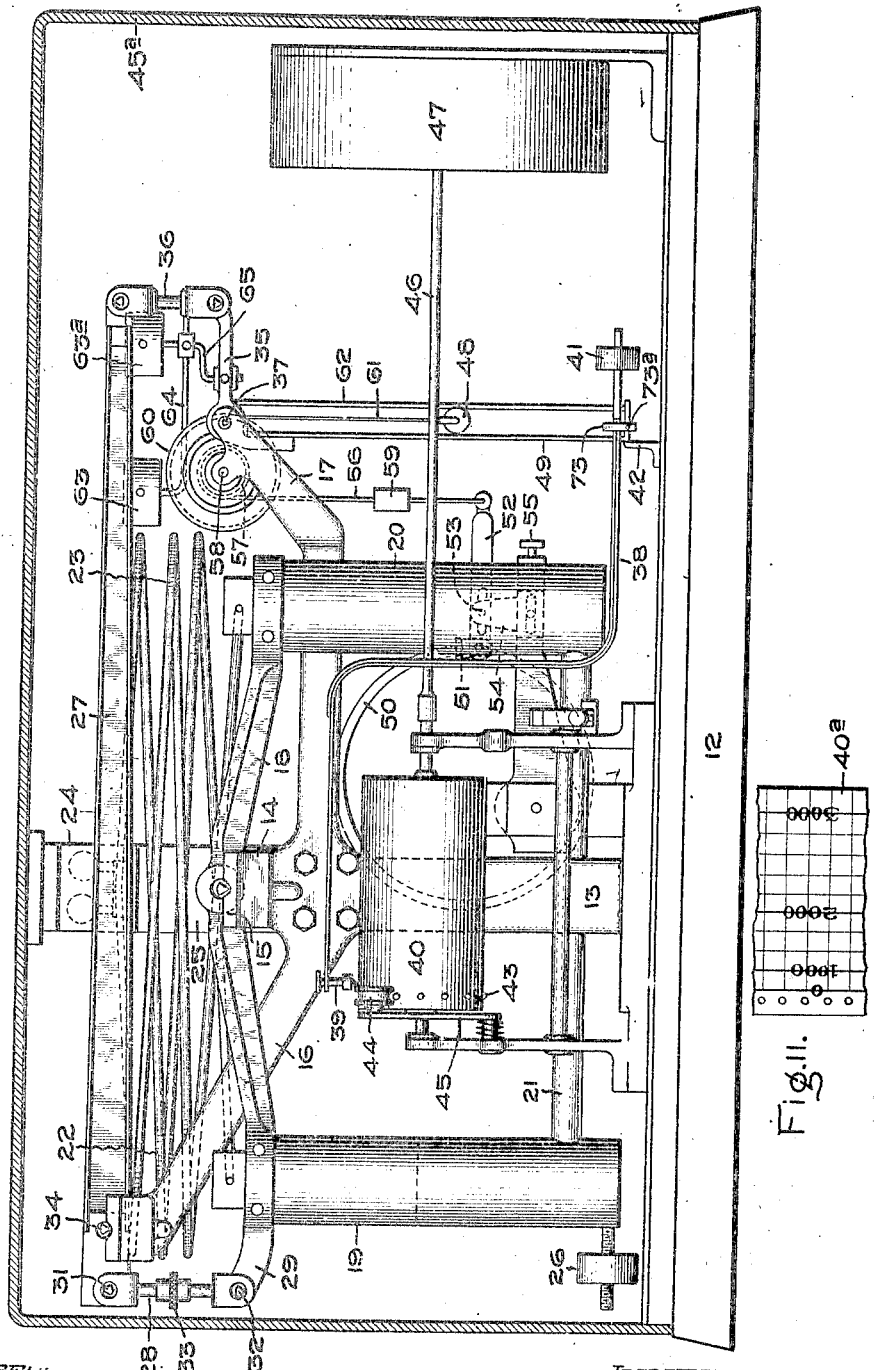

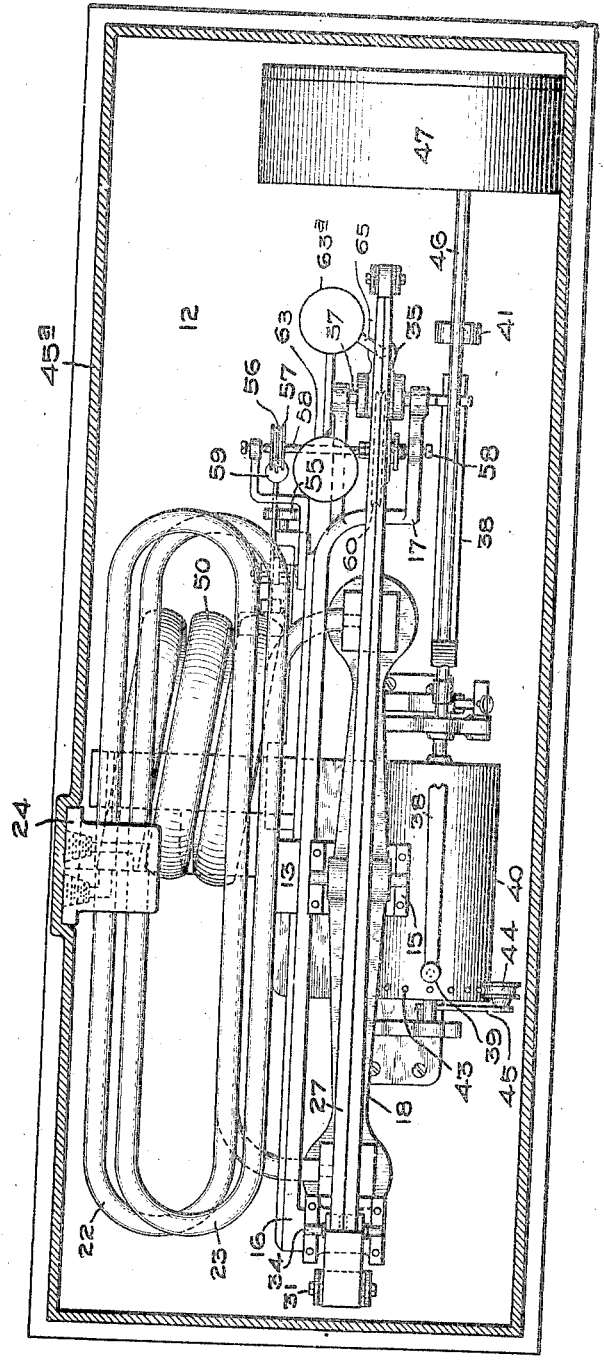

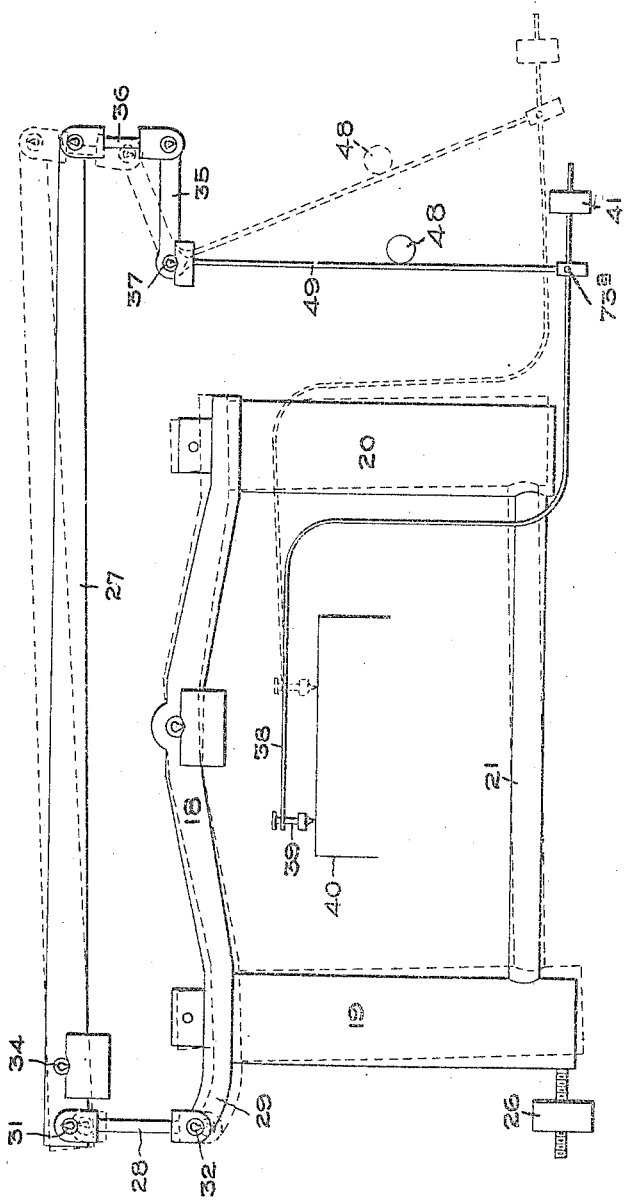

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

FLUID-METER.

1,087,932.	Specification of Letters Patent.	Patented Feb. 24, 1914.

Application filed September 25, 1909. Serial No. 519,526.

*To all whom it may concern:*

Be it known that I, AUSTIN R. DODGE, a citizen of the United States, residing at Schenectady, county of Schenectady, State of New York, have invented certain new and useful Improvements in Fluid-Meters, of which the following is a specification.

The present invention relates to meters for indicating and recording the flow of fluid through a main, and more especially the flow of an elastic fluid such as steam, air or other gas, but it is not necessarily limited thereto.

The object of the invention is to provide a meter which will accurately indicate or record or both indicate and record the flow of fluid through a main in a given unit or units of time, such meter being simple in construction and reliable in operation and not likely to get out of order.

For a consideration of what I believe to be novel and my invention, attention is directed to the accompanying specification and the claims appended thereto.

In the accompanying drawings which are illustrative of one of the embodiments of my invention, Figure 1 is a view in side elevation of an elastic fluid meter; Fig. 2 is a plan view of the same; Fig. 3 is a diagrammatic view of the tilting member and the motion multiplying connection between it and the indicator; Fig. 4 is a detail view showing the balancing weights for the indicator and its supporting arm; Fig. 5 is a detail view of the pressure correction device; Fig. 6 is a horizontal section of a fluid carrying main showing the Pitot plug in place; Fig. 7 is a detail view of the joint between the indicator carrying arm and its supporting and actuating bell-crank lever; Fig. 8 is a detail view of one of the flexible connections employed to convey fluid pressure from the main to the tilting member; Fig. 9 is a section on line 9—9 of Fig. 8; Fig. 10 is a section on line 10—10 of Fig. 8; and Fig. 11 is a detail view of a portion of the chart.

The meter comprises a pivoted or tilting member responsive to changes in the rate of flow of the fluid being metered and having connected mercury-containing cups and a motion multiplying means connected to and actuated by said member. The movements of said means away from the initial position are made in opposition to a weight or equivalent means. In order to indicate the rate of flow at any given instant, an indicator, such as a pointer, pen or equivalent device is provided that is moved over a suitable chart or scale by said means. To record the movements of the indicator it is arranged to make a mark or other indication on the chart or scale and the latter is driven or moved by a suitable means such as a clock. Fluids, especially steam, flowing through mains are subject to pressure variations and to compensate for such changes a means sensitive to pressure is provided that controls or actuates a pressure correction device, such as the weight or equivalent means another function of which has been referred to, which in turn modifies the action of the tilting or pivoted member having the mercury cups by opposing to a greater or less extent certain movements of the motion multiplying mechanism. Generally speaking the pressure responsive device will make the meter read higher upon an increase in pressure and lower on a decrease in pressure.

12 indicates the base of the meter and mounted thereon is a standard or support 13 having a central part 14 that supports the seat 15 for the knife-edge pivot of the tilting member, and arms 16 and 17 that supports seats or form bearings for other parts of the moving system as will appear later. The meter depends for its operation on a tilting member comprising a bridge piece 18 and mercury containing cups 19 and 20, the latter being connected by the conduit 21 at their lower ends. Fluid pressure is admitted to the mercury cups by the flexible metallic connections 22 and 23 made of tubes having flattened sides. Tube 22 is connected to the low pressure side of the system and tube 23 to the high. The lower or inner end of the low pressure tube 22 is connected to the head of the left-hand mercury cup 19 and the upper or outer end to the head 24. The lower or inner end of the high pressure tube 23 is connected to the head on the right-hand mercury cup 20 and the upper or outer end to the head 24, said head being carried by a vertical support 25 at the back of the meter. The tubes 22 and 23 are made in the form of flexible and elongated coils so as to eliminate as far as possible any opposition to movement of the tilting member. The mercury cups and their coöperating parts are balanced as completely as possible. An adjustable counter-balance 26 is mounted on the screw-threaded rod attached to the left-hand mercury cup 19 so that the tilting member can be accurately balanced.

The motion multiplying means or mechanism connected to the member and the indicator will now be described: Extending horizontally above the cups is a lever or beam 27, the left-hand end of which is attached by a link 28 to the tilting member through an extension 29 on the bridge piece. The link is connected to the parts 27 and 29 by knife-edge pivots 31 and 32 to reduce friction and is provided with an adjusting nut 33 that receives the threaded ends of the parts of the link. The beam itself is supported by a knife-edge pivot 34, the seat for which is carried by the arm 16. The right-hand end of the beam or lever is attached to the bell-crank lever 35 which actuates the indicator by the link 36. The link is provided with knife-edge pivots to reduce friction. The bell-crank lever is provided with a knife-edge pivot 37, the seat for which is carried by the arm 17. To the depending part of the lever is pivotally attached a light arm 38 which carries the indicator, such as a pen 39, for indicating the rate of flow of the fluid being metered. Under the pen is a drum 40 over which the paper, chart or scale moves. The pen carrying arm is provided with an adjustable counter-weight 41 located at the right of its pivotal connection with the bell-crank lever. The center of gravity of the arm and weight is slightly to the left of its pivotal support. The pen must always press on the chart but with small friction; hence the weight 41 should nearly but not quite balance the pen carrying arm 38. The weight is made adjustable so that the proper relation of parts can be effected. 42 indicates a stop to limit the movement of the pen to the left.

Since this meter is intended for recording as well as momentarily indicating the rate of flow of fluid in the main, the drum 40 is provided and over it passes a strip of paper 40$^a$, Fig. 11, or equivalent material forming a chart. The strip is perforated on one edge to receive the pins 43 carried by the drum and insure the proper feed. The strip is held in place by a roller 44 carried by a spring-pressed arm 45. The strip is fed as is customary from a reel suitably supported and the outer end or that part containing the mark or other indication made by the pen, pencil or other device passes out of the meter and may be torn off from time to time if desired or it may be wound on a reel in a well-known manner. The drum is driven by a spindle 46 and the latter is rotated by a clock 47, the details of which are immaterial so long as the instrument is accurate and has sufficient power to drive the drum.

A meter of the character described must work against a load or resistance of some character since otherwise with the delicate balancing of parts provided for, the indicator would immediately travel across the scale or chart when fluid under pressure was admitted to the tilting member and an unbalanced condition effected. This load or resistance comprises a suspended weight 48 whose opposition or resistance to movement of the tilting member and the motion multiplying means or mechanism increases as it moves laterally from the position shown. In other words the effective leverage of the weight on the arm 49 of the bell-crank lever 35 increases as the arm swings it toward one side from its initial position as shown in Fig. 1. I arrange the weight to engage the motion multiplying means rather than said tilting member 18 because it takes less weight and since, as the movement is greater at this point than elsewhere, I am able to more completely control the weight and its action as will appear in connection with the pressure correction device. As shown in Fig. 1, the arm 49 is in its initial position; in other words, when weight 48 and arm 49 stand in the position shown, the reading of the meter will be zero.

When no fluid is flowing in the main or when the meter is disconnected, the mercury in the cups stands at the same level in both as indicated by the dotted line. The fluid as it flows through the main creates a pressure difference that bears a definite relation to the rate of flow. In the meter illustrated this pressure difference is produced by the action of the flowing fluid on an agent or device such as a Pitot plug, for example, and said pressure difference being communicated to the mercury cups or containers causes the mercury to be forced from the high to the low pressure cup, assuming an increase in the rate of flow, the amount being dependent upon said rate. This unbalances the tilting member and its movement causes the beam 27 to move and the right-hand end moves the bell-crank lever 35 against the action of weight 48 and with it the arm 38 and indicator 39. Changes in the rate of flow cause changes in said pressure difference and the pen assumes a corresponding position on the chart. The position of the pen 39 indicates the rate of flow at any given instant and the pen in traveling from one position to another records on the paper or chart its various movements. The movement of the parts is well illustrated in Fig. 3, the dotted lines indicating one of the many positions that may be taken by said parts.

*Pressure correction.*—In metering fluids such as steam, air and other gases whose density changes from time to time, it is necessary to take this change into account. To this end a device sensitive to pressure changes is provided. It comprises in the present embodiment of my invention a coiled tube 50 made somewhat after the fashion of a Bourdon tube. It is provided with a number of turns, two and a half in the present case, to give it a considerable range of movement. One end is fixed to the support 50ª, Fig. 5, and is connected to the main through which the fluid to be metered flows. The other end is provided with a head 51 that is pivotally connected to the lever 52, the latter having a pivot 53 located in a slot in the lever. The pivot is carried by a post 54, Fig. 1, and the latter may be adjusted to-and-fro by the screw 55. To the right-hand end of the lever 52 is attached a fine silk thread 56 or equivalent means. The other end of the thread is attached to a relatively small sheave or drum 57 mounted on the pivot pin or spindle 58, the latter being supported in bearings in the arm 17. Connected to the thread in a manner to hold it taut and to compensate for the traveling balance weight 48 is a counterweight 59. On the pivot pin 58 is a larger sheave or drum 60, Fig. 5. To this is attached at one end another silk thread, cord or equivalent means 61, by which the traveling weight 48 is suspended. The weight is so supported that it can roll on the vertical arm 49 of the bell-crank lever 35 and said arm in addition to moving the pen forms a track for the moving or balancing weight. To hold the weight in place a guide 62, Fig. 1, is provided that moves with the bell-crank lever. The axis of the thread 61 passes as nearly as possible through the axis of the pivot 37 and at right angles thereto so as not to be affected by movements of the bell-crank lever. When the weight 48 is in the position shown, that of zero pressure and zero flow, it has no effect on the pen and its arm but as the bell-crank lever 35 moves it from the position shown toward the right the effective action of the weight gradually increases as will readily be seen. So long as the pressure of the fluid to be metered remains constant the balancing and pressure correction weight is held at the same distance from the pivot 37. When the pressure increases the coils of the pressure responsive device unwind to a certain extent depending upon the change and move the right-hand end of the lever 52 downward thereby turning the sheaves 57 and 60 to raise the weight 48 by varying the effective length of its suspension 61 by winding a portion thereof on the sheave 60. Raising the weight decreases its opposition to movement of the tilting member and the motion multiplying means and consequently the reading of the instrument will be proportionately higher as should be the case with an increase in pressure. It will thus be seen that the weight 48 has a definite position for a given pressure. In order to counter-balance the weight of the pen carrying arm 38 a counter-weight is provided that is mounted on the bell-crank lever 35. As shown it comprises, Figs. 1, 2 and 4, a main weight 63 and an auxiliary weight 63ª, both of which are adjustable on their supports 64 and 65. I have found it desirable to use more than one weight since the meter can be more accurately balanced and rendered more sensitive thereby.

In Fig. 6 is shown an agent for creating a pressure difference and which is located in the main through which the fluid to be metered flows. It comprises a base 66 that is screw-threaded and mounted in an opening in the main 67. Supported by the base is a perforated tube 68, said perforations facing the moving column of fluid and forming the high pressure portion of the agent or Pitot plug. Inside of the main tube is an inner tube 69 and an intermediate tube 70. The inner tube is connected top, bottom and in the rear with the region immediately surrounding the outer tube and forms the low pressure side of the agent or Pitot plug. Fluid pressure is conveyed by the pipe 71 to the head 24 and thence by the flexible connector 23 to the high pressure mercury cup 20, and by the pipe 72 to the head 24 and by the flexible connector 22 to the low pressure mercury cup 19. I am using the terms "high and low pressure" in their relative sense meaning that one is higher than the other. This pressure difference forces mercury from the cup 20 into the cup 19 of the tilting member, hence making the latter cup heavier and causing it to tilt said member and depress the part 29 and the left-hand end of the beam 27. The meter is subjected to substantially the same pressure as the interior of the main 67 and hence the walls of the pipes, connectors, mercury cups, etc., must be strong enough to withstand such pressures.

In Fig. 7 is shown the pivotal connection between the indicator carrying arm and the depending arm of the bell-crank lever. 38 indicates the pen carrying arm. It is supported by a U-shaped arm 73 that is secured to the bell-crank lever arm 49. The arm is provided with two pins 73ª that have conical ends and are seated in a cross-piece 74 that is secured to the pen carrying arm 38. This arrangement permits the parts to swing back and forth, at the same time permitting the pen to travel back and forth over the face of the chart.

In Figs. 8 to 10, inclusive, is shown one of the flexible connectors. It is made of thin walled tubing that has semi-circular ends 75 of circular cross-section, Fig. 9, and flattened sides 76 of the section shown in Fig. 10. The flattening of said sides makes the connector extremely flexible in a vertical plane which is necessary to insure freedom of motion of the tilting member and at the same time the connector possesses the necessary strength to resist the pressures to which it is subjected. By applying the weight 48 or its equivalent to the portion of the motion multiplying means having the greatest movement, I am able to use a smaller weight than would be the case if applied elsewhere. Being small it can readily be supported by means operating virtually without friction. Further by combining the means opposing the movements of the tilting member with the pressure correcting means at least one part is eliminated, and the meter is thereby rendered more simple and reliable.

The parts of the meter are accessible both for the purpose of inspection and adjustment which is a valuable feature in commercial work. Owing to the character of the parts and the connections between them the movements of the tilting member are transmitted to the indicator with minimum friction and lost motion; both of which features make for accuracy of the meter readings. The meter may be calibrated for direct reading so that special skill on the part of the user is unnecessary. The instrument is portable and no special fittings are required in the main that conveys the fluid being metered although it is capable of use with such fittings if desired. When the Pitot plug is used as the agent it requires only one tapped hole in the main and this is comparatively small and is inexpensive to make. The meter may be kept in service all of the time or shut off by valves in the pipes leading to it from the agent. The balancing of the parts is so full and complete and the movements are so sensitive to changes in the rate of flow that no correction for error is necessary.

When the service conditions are such that the pressure of the fluid being metered is constant or substantially so, the Bourdon tube 50 and its coöperating parts can be omitted. Under these conditions the weight 48 may be secured to the arm 49 at the point where it would be held by said tube and parts. When it becomes necessary or desirable to compensate for changes in superheat, the position of the weight 48 may be changed by adjusting the position of the drum 60 on the spindle 58. It will be noted that the main lever 27 extends substantially parallel to the bridge piece 18 of the tilting member, that the arm 49 of the lever 35 extends downwardly and is substantially parallel to the mercury cups, and that the arm 38 carrying the marker 39 extends to the left toward the point of connection between the tilting member and the main lever 27. This arrangement results in a meter which is extremely simple and compact and one in which the travel of the marker from zero to maximum flow positions is so great that the chart can be readily read while the movement of the mercury containing member is relatively small. By mounting the bearing for the knife edge of the tilting member and those for the knife edges 34 and 37 and spindle 58 on the same casting perfect alinement of the parts is assured at all times.

In accordance with the provisions of the patent statutes, I have described the principles of the operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is—

1. In a fluid meter, the combination of a member adapted to be moved in response to changes in the rate of flow of the fluid being metered, an indicator, a motion multiplying means for transmitting movements of the member to the indicator, a weight acting on some portion of the means which has a greater movement than said member to oppose its movements from the initial position, and a device with which the indicator coöperates to show the flow.

2. In a fluid meter, the combination of a member adapted to be moved in response to changes in the rate of flow of the fluid being metered, an indicator, means arranged between and mechanically connecting the member and the indicator for transmitting movements of the former to the latter, a weight carried by said means and acting in opposition thereto as the latter moves from its initial position, and a device with which the indicator coöperates to show the flow.

3. In a fluid meter, the combination of a member movable in response to changes in the rate of flow of the fluid being metered, an indicator, means transmitting the movements of the member to the indicator, a device acting on said means which opposes the movements of the member by progressively increasing amounts as the indicator moves from its initial position, and means for adjusting said device to compensate for changes in the condition of the fluid being metered.

4. In a fluid meter, the combination of a member adapted to be moved in response to changes in the rate of flow of the fluid being metered, an indicator, means transmitting the movements of the member to the indicator, a device acting on said means which opposes the movements of the member by progressively increasing amounts as the indicator moves from its initial position, and a means sensitive to pressure changes of the fluid being metered for varying the effective action of said device.

5. In a fluid meter, the combination of a member adapted to be moved in response to changes in the rate of flow of the fluid being metered, an indicator, means for transmitting motion from the member to the indicator, a weight which as it is moved away from its initial position offers resistance to the movement of said member, a device for suspending the weight so that it can act on said means, and means responsive to changes in a condition of the fluid that varies the effective length of said suspension device.

6. In a fluid meter, the combination of a member adapted to be moved in response to changes in the rate of flow of the fluid being metered, a pivot about which the member moves, an indicator, means for transmitting movements of the member to the indicator which means includes a lever, a pivot for the lever arranged intermediate its ends, a connection between one arm of the lever and said member, a lever arranged substantially at right angles to the first lever, a connection between the other arm of the first lever and the second lever, and a weight acting on said second lever which offers resistance to its movement by said member as the rate of flow of the fluid being metered increases.

7. In a fluid meter, the combination of a member adapted to be moved in response to changes in the rate of flow of the fluid being metered, an indicator, means comprising articulated levers for transmitting movements of the member to the indicator, a weight that rests on one of the levers and as it is swung to one side of its initial position progressively increases its opposition to movement of lever with which it engages, and a means for suspending the weight.

8. In a fluid meter, the combination of a member adapted to be moved in response to changes in the amount of fluid flowing in a main in a given unit of time, an indicator, means including a lever for transmitting movements of the member to the indicator, a weight that acts on the lever and as it is moved away from its initial position offers a progressively increasing opposition to movement of the lever, means for suspending the weight, and a guide for the weight.

9. In a fluid meter, the combination of a tilting member, means for tilting the member, an indicator, a motion multiplying means for transmitting movements of the member to the indicator comprising a lever having arms of unequal length, and a connection between the member and the shorter arm of the lever, and a means acting on the part of said motion multiplying means which has the greatest movement for opposing its movements away from its initial position.

10. In a fluid meter, the combination of a tilting member, means for conveying fluid under pressure to the member, an indicator, a motion multiplying means for transmitting movements of the member to the indicator, and an adjustable means acting on the part of the motion multiplying means that is connected to the indicator for opposing its movements away from its initial position.

11. In a fluid meter, the combination of a tilting member, means for tilting the member, an indicator, a motion multiplying means comprising articulated levers having arms of different lengths and transmitting movements of the member to the indicator, and a connection between the short arm of one lever and the long arm of the other, and means acting on the lever arm having the greatest movement to oppose its movement in a given direction.

12. In a fluid meter, the combination of a tilting member, means for carrying fluid under pressure to the member, an indicator, a pivotally supported lever, an articulated connection between the lever and one side of the member, and a means actuated by the lever for moving the indicator.

13. In a fluid meter, the combination of a tilting member, means for tilting the member, an indicator, a chart, an arm for moving the indicator across the chart, means actuated by the member for moving the arm, said means comprising a lever pivoted intermediate its ends, a connection between the member and one arm of the lever, a bell-crank lever, a connection between the other arm of the first lever and the bell-crank lever, and a pivotal connection between the bell-crank lever and the indicator arm.

14. In a fluid meter, the combination of a tilting member, means for tilting the member, an indicator, an arm for moving the indicator in a given plane across a chart, a chart, a motion multiplying means connected to the member for moving the arm, said means including a pivoted lever, and a pivotal connection between the lever and the arm which permits the lever to move in an arc and the indicating device to have a right line movement.

15. In a fluid meter, the combination of a member adapted to be moved in response to changes in the rate of flow of the fluid being metered, an indicator, means for transmitting the movements of the member to the indicator and comprising a two-armed lever, a weight carried by one arm of the lever that tends to oppose the movement of the member, and a counterbalancing means for the indicator carried by the other arm of the lever.

16. In a fluid meter, the combination of a member adapted to be moved in response to changes in the rate of flow of the fluid being metered, an indicator, an arm supporting the indicator, a motion multiplying means for transmitting motion from the member to the arm and indicator which includes a bell-crank lever having one arm arranged substantially vertical, a weight carried by said vertical arm that tends to oppose the movement of the member, and a counterbalancing means carried by the other arm of the lever.

17. In a fluid meter, the combination of a tilting member, means for tilting the member, a support for the member, a lever, a pivotal support therefor, a connection between the lever and the member, a second lever, means connecting the two levers, said second lever having a substantially vertical arm, a weight carried by said arm that tends to oppose its movement away from a vertical position, an indicator, and an arm connected to the second lever which supports the indicator.

18. In a fluid meter, the combination of a tilting member provided with a bridge piece carrying containers, each containing a fluid heavier than that being metered, a support on which the bridge piece is pivoted intermediate the containers, conduits admitting fluid under pressure to the containers, a conduit connecting the containers, a pivoted lever having unequal arms, a link connecting the shorter arm of the lever with one end of the bridge piece, an indicator, a lever for actuating it, and a link connecting the longer arm of the first lever with the second lever.

19. In a fluid meter, the combination of a tilting member that includes mercury containing cups and a conduit connecting the cups, conduits admitting fluid under pressure to the cups, a pivoted lever, means connecting the lever to the member, a second lever, means connecting the two levers, an arm pivotally supported and actuated by the second lever, a chart, an indicator carried by the arm on one side of its pivot and arranged to move over the chart, and a counterbalancing means for the arm and indicator.

20. In a fluid meter, the combination of a member adapted to be moved in response to changes in the rate of flow of the fluid being metered, a motion multiplying means comprising articulated levers, means connecting one of the levers to the member, an arm carried by one of the levers and pivotally connected thereto, a counterbalance for the arm which is carried by one of the levers, an indicator carried by the arm on one side of its pivot, and a counterbalance for the arm located on the side of the pivot opposite the indicator.

21. In a fluid meter, the combination of an agent located in the main through which the fluid to be metered flows, said agent acting to create a pressure difference responsive to changes in the rate of flow of the fluid, a member movable in response to changes in said pressure difference, said member comprising a bridge piece, liquid containing cups carried thereby, and a pivot for the bridge piece arranged intermediate the cups, means connecting the agent and the cups, an indicator, and a motion multiplying means for transmitting movements of the member to the indicator, said means being connected to one end of the bridge piece.

22. In a fluid meter, the combination of a member adapted to be moved in response to changes in the rate of flow of the fluid being metered, an indicator, a motion multiplying means for transmitting movements of the member to the indicator, an element sensitive to changes in pressure, and means whereby said element imposes a greater or less opposition to movements of the member as the pressure changes.

23. In a fluid meter, the combination of a member adapted to be moved in response to changes in the rate of flow of the fluid being metered, an indicator, means comprising articulated levers for transmitting movements of the member to the indicator, a device sensitive to pressure changes of the fluid being metered, and means whereby said device acts on one of said levers to impose a greater or less opposition to movements of the member.

24. In a fluid meter, the combination of a member adapted to be moved in response to changes in the rate of flow of the fluid being metered, an indicator, a motion multiplying means for transmitting movements of the member to the indicator, and a pressure correction device comprising an agent sensitive to changes in the pressure of the fluid, and means whereby said agent acts on the portion of the motion multiplying device having the greatest movement to impose a greater or less opposition to the movements of the member.

25. In a fluid meter, the combination of a member adapted to be moved in response to changes in the rate of flow of the fluid being metered, an indicator, a means for transmitting motion from the member to the indicator which includes a pivoted element, a weight whose opposition to movement of the member increases as said weight is moved from its initial position, a flexible means for suspending the weight, the axis of which passes through the plane of the pivot of said element, and means for adjusting said suspending means to vary the action of the weight and thereby compensate for changes in the condition of the fluid.

26. In a fluid meter, the combination of a member adapted to be moved in response to changes in the rate of flow of the fluid being metered, an indicator, means whereby the member actuates the indicator, means that opposes the movement of the member as the latter moves from its initial position, and a device sensitive to changes in the pressure of the fluid being metered which varies the effective action of said means on the member.

27. In a fluid meter, the combination of a member adapted to be moved in response to changes in the rate of flow of the fluid being metered, an indicator, means whereby the member actuates the indicator, a weight that opposes the movement of the member in one direction, means for suspending the weight, and a device sensitive to the pressure of fluid for raising and lowering the weight through said suspension means.

28. In a fluid meter, the combination of a member adapted to be moved in response to changes in the rate of flow of the fluid being metered, an indicator that is actuated by said member, a weight, a flexible medium by which the weight is suspended, means whereby the weight opposes the movement of the member in a given direction, a drum for winding and unwinding said medium, and a device sensitive to pressure for moving the drum.

29. In a fluid meter, the combination of a member adapted to be moved in response to changes in the rate of flow of the fluid being metered, an indicator, means for transmitting motion from the member to the indicator, a weight coöperating with said means that offers progressively increasing opposition to movements of the member away from its initial position and a pressure sensitive device for modifying the action of the weight on the member.

30. In combination, an agent located in the main carrying the fluid to be metered which causes a pressure difference varying with changes in the rate of flow, a meter comprising a member that is moved a greater or less extent depending upon the pressure difference, conduit means connecting the agent and the member, a means opposing movements of the member away from its initial position, and a pressure responsive device which varies the effective action of said means.

31. In a fluid meter, the combination of a tilting member having mercury cups, a conduit connecting the cups, and flexible connectors for conveying fluid under pressure to the cups, each of said connectors being made of thin tubing bent to form a coil, the cross-section of each turn of the coil at the end being round and that on the sides flat.

32. In combination, an agent for creating a pressure difference sensitive to the rate of flow of the fluid being metered, a tilting member comprising mercury containing cups, a conduit connecting the cups, conduits conveying fluid under pressure from the agent to the mercury cups, motion multiplying means including articulated levers connected to and moved by the member, a chart, a means for moving it, an indicator, an arm carried by the lever having the greater motion which supports the indicator, main and auxiliary weights carried by the last named lever for counterbalancing the arm and indicator, a suspended weight that opposes the movements of the indicator away from its initial position, means for suspending the weight on said lever, and means sensitive to pressure for raising and lowering the weight as the pressure changes.

33. In a fluid meter, the combination of a movable member, means acting in response to changes in the rate of flow of the fluid being metered for moving said member, a device opposing the movements of the member, and a means sensitive to a condition of the fluid being metered for varying the effective action of the device on said member.

34. In a fluid meter, the combination of a member adapted to be moved in response to changes in the rate of flow of the fluid being metered, an indicator, means for transmitting motion from the member to the indicator, a weight which opposes the transmitting of motion by the member to the indicator, and a device for moving the weight in a manner to change its effective opposition to the movements of the member from its initial position.

35. In a fluid meter, the combination of a tilting member, means for tilting the member, a main lever which extends across the top of said member, means connecting one end of the lever with the member, a second lever located below the main lever, means connecting the two levers, and a pivotally supported arm carried by the second lever, said arm extending substantially parallel with the main lever.

36. In a fluid meter, the combination of a tilting member comprising a bridge piece, fluid containing cups, and a conduit connecting the cups, and conduits for admitting fluid under pressure to the cups, with a main lever which extends substantially parallel to the bridge piece, a means for connecting the tilting member with one end of the lever, a second lever, means connecting the two levers, one arm of the second lever extending substantially parallel with one of the fluid containing cups, and a marker carrying arm which is pivotally attached to the lever arm, said marker carrying arm being substantially parallel to the main lever.

37. In a fluid meter, the combination of a tilting member comprising two fluid containing cups, a bridge-piece for connecting and supporting the cups, and a conduit connecting the lower ends of the cups and through which fluid may flow, with a pivotal support for the bridge-piece, a main lever, a connection between the lever and the bridge-piece, a pivotal support for the lever, a second lever, means connecting it with the first, a pivotal support for the second lever, an indicator carried by the second lever, and a frame which carries said pivotal supports.

38. A fluid meter comprising a lever, a fulcrum for the lever, a sliding weight mounted on the lever, means responsive to the rate of flow of the fluid being metered which moves the lever about its fulcrum, and a device responsive to a condition of said fluid that moves the weight on the lever.

39. A fluid meter comprising a member adapted to be moved in response to changes in the rate of flow of the fluid being metered, a pivoted lever, means connecting the lever with the member, a weight carried by the lever, and a device responsive to variations in the pressure of the fluid which moves the weight on the lever.

40. In a fluid meter, the combination of a member adapted to be moved in response to changes in the flow of the fluid being metered, an indicator, means whereby the member actuates the indicator, a weight carried by said means that opposes the movement of the member in a given direction, and means for adjusting the position of the weight to vary its effective action on said member and thereby compensate for changes in the condition of the fluid.

41. In a fluid meter, the combination of a member adapted to be moved in response to the changes in the rate of flow of the fluid being metered, an indicator, means including a lever for transmitting movements of the member to the indicator, a pivot for the lever, and a weight carried by the lever, the movement of the weight opposing the movement of the lever by said member increasing as the lever is moved about its pivot as the flow increases.

42. In a fluid meter, the combination of a tilting member comprising two fluid containing cups, a means for connecting and supporting the cups, and a conduit connecting the lower ends of the cups through which fluid may flow, with a pivotal support for said means, a lever which extends in the same general direction as said means, a pivot for the lever, a means connecting the supporting means and lever for transmitting motion from one to the other, an indicating device, and means controlled by the lever for determining the position of the indicating device.

43. In a fluid meter, the combination of a pair of fluid containing cups, a supporting piece to which they are connected, a conduit connecting the cups and through which fluid may flow from one to the other, a fulcrum means for the supporting piece, an indicating device, a motion multiplying lever, a fulcrum for the lever, a means for transmitting movements of the cups and supporting piece to the lever, and means controlled by the lever for causing movements of the indicating device.

In witness whereof, I have hereunto set my hand this 23rd day of September, 1909.

AUSTIN R. DODGE.

Witnesses:
HELEN ORFORD,
A. F. KNIGHT.